United States Patent
Chen (10) Patent No.: US 11,357,079 B2
(45) Date of Patent: Jun. 7, 2022

(54) BASE STATION AND USER EQUIPMENT WITH ENHANCED PDCP DUPLICATION

(71) Applicant: Institute For Information Industry, Taipei (TW)

(72) Inventor: Chiu-Wen Chen, Taipei (TW)

(73) Assignee: Institute For Information Industry, Taipei (TW)

( * ) Notice: Subject to any disclaimer, the term of this patent is extended or adjusted under 35 U.S.C. 154(b) by 27 days.

(21) Appl. No.: 16/875,516

(22) Filed: May 15, 2020

(65) Prior Publication Data

US 2021/0051766 A1    Feb. 18, 2021

Related U.S. Application Data

(60) Provisional application No. 62/886,365, filed on Aug. 14, 2019.

(51) Int. Cl.
| | |
|---|---|
| *H04W 88/10* | (2009.01) |
| *H04W 88/06* | (2009.01) |
| *H04L 5/00* | (2006.01) |
| *H04W 76/11* | (2018.01) |
| *H04W 80/02* | (2009.01) |
| *H04W 76/27* | (2018.01) |
| *H04L 1/16* | (2006.01) |

(52) U.S. Cl.
CPC .......... *H04W 88/10* (2013.01); *H04L 1/1614* (2013.01); *H04L 5/0098* (2013.01); *H04W 76/11* (2018.02); *H04W 76/27* (2018.02); *H04W 80/02* (2013.01); *H04W 88/06* (2013.01)

(58) Field of Classification Search
None
See application file for complete search history.

(56) References Cited

U.S. PATENT DOCUMENTS

| | | | |
|---|---|---|---|
| 2014/0056243 A1* | 2/2014 | Pelletier | H04W 36/0072 370/329 |
| 2015/0117357 A1* | 4/2015 | Ozturk | H04L 47/41 370/329 |
| 2016/0044735 A1* | 2/2016 | Ohta | H04W 76/15 455/422.1 |
| 2016/0182276 A1* | 6/2016 | Wu | H04L 41/0654 370/225 |

(Continued)

*Primary Examiner* — Edan Orgad
*Assistant Examiner* — Emmanuel K Maglo
(74) *Attorney, Agent, or Firm* — Skaar Ulbrich Macari, P.A.

(57) ABSTRACT

A base station and a user equipment with enhanced PDCP duplication are provided. The base station generates at least one RRC message for a user equipment, wherein the at least one RRC message includes a set of multiple activation criteria, and each activation criterion corresponds to one of multiple RLC entities. The base station transmits the at least one RRC message to the user equipment. Multiple logical channels are provided in a MAC layer, each RLC entity corresponds to at least one of the logical channels, each RLC entity corresponds to a working status (activation or deactivation). At least one of the working statuses of the RLC entities is changed due to at least one of the activation criteria being satisfied, and the base station changes a transmission restriction of at least one specific logical channel among the logical channels based on the changed working statuses of the RLC entities.

17 Claims, 8 Drawing Sheets

(56) References Cited

U.S. PATENT DOCUMENTS

| | | | |
|---|---|---|---|
| 2018/0098250 A1* | 4/2018 | Vrzic | H04W 36/18 |
| 2019/0098682 A1* | 3/2019 | Park | H04L 1/08 |
| 2019/0215685 A1* | 7/2019 | Wang | H04W 8/22 |
| 2019/0230667 A1* | 7/2019 | Loehr | H04W 8/02 |
| 2019/0253924 A1* | 8/2019 | Kim | H04W 28/0278 |
| 2020/0236734 A1* | 7/2020 | Wei | H04L 1/08 |
| 2021/0014728 A1* | 1/2021 | Kuo | H04B 17/318 |

* cited by examiner

| R | R | LCID | | | |
|---|---|---|---|---|---|
| R | WS1 | WS2 | WS3 | WS4 | DRB_ID |
| Cell_ID | | | | | |

| R | R | LCID | | | |
|---|---|---|---|---|---|
| CH_TR | WS1 | WS2 | WS3 | WS4 | DRB_ID |
| Cell_ID | | | | | |

| R | R | LCID | | | |
|---|---|---|---|---|---|
| R | WS1 | WS2 | WS3 | WS4 | DRB_ID |
| TR_BMP | | | | Cell_ID | |

| R | R | LCID | | | |
|---|---|---|---|---|---|
| R | WS1 | WS2 | WS3 | WS4 | DRB_ID |
| TR_IDX | | | | Cell_ID | |

| R | R | LCID | | | |
|---|---|---|---|---|---|
| R | WS1 | WS2 | WS3 | WS4 | DRB_ID |
| P1_IDX | | P2_IDX | P3_IDX | | P4_IDX |
| P1_IDX | | P2_IDX | P3_IDX | | P4_IDX |

| R | R | LCID | | | |
|---|---|---|---|---|---|
| R | WS1 | WS2 | WS3 | WS4 | DRB_ID |
| R1_IE_IDX | | R2_IE_IDX | R3_IE_IDX | | R4_IE_IDX |

BASE STATION AND USER EQUIPMENT WITH ENHANCED PDCP DUPLICATION

PRIORITY

This application claims priority to U.S. Provisional Patent Application No. 62/886,365 filed on Aug. 14, 2019, which is hereby incorporated by reference in its entirety.

FIELD

The present invention relates to a base station and a user equipment. More specifically, the present invention relates to a base station and a user equipment with enhanced Packet Data Convergence Protocol (PDCP) duplication.

BACKGROUND

Packet Data Convergence Protocol (PDCP) duplication (also known as packet duplication) is the key to low latency and high reliability in the fifth generation of mobile communication technology (5G). To meet the Ultra-Reliable and Low Latency Communication (URLLC) and Industrial Internet of Things (IIoT) requirements, a base station can configure up to 4 Radio Link Control (RLC) entities per Data Radio Bearer (DRB) (i.e. up to 4 legs per DRB) for PDCP duplication.

The Medium Access Control (MAC) layer provides services to the RLC entities in the form of logical channels, and each logical channel corresponds to a transmission restriction. The transmission restriction of each logical channel may comprise one or more parameters, such as a parameter indicating the allowed serving cell, a parameter indicating the maximum Physical Uplink Shared Channel (PUSCH) duration allowed for transmission, a parameter indicating whether a configured grant (Type 1) can be used for transmission, a parameter indicating the allowed subcarrier spacing for transmission (but not limited thereto). The MAC layer is in charge of scheduling the packets of the logical channels according to their transmission restrictions when there is a granted resource, and this procedure is known as Logical Channel Prioritization (LCP).

According to the current specification of 5G, a base station is in charge of the activation and deactivation of the PDCP duplication for each DRB. Specifically, when a Radio Resource Control (RRC) entity of a base station configures an information element regarding the PDCP layer, a bit is used for indicating whether the PDCP duplication is activated or deactivated. When the PDCP duplication is activated for a DRB, the base station further dynamically controls how a set of the configured RLC entities are used by a user equipment for the PDCP duplication (i.e. indicating which of the configured RLC entities is/are activated for the PDCP duplication) by sending by a MAC control element to the user equipment. Since the base station has to determine the activation and deactivation of the RLC entities and then inform the user equipment of the determination, there will be latency when adopting the aforesaid approach in the uplink scenario.

As mentioned, each logical channel corresponds to a transmission restriction. For a logical channel, the content of the transmission restriction when the PDCP duplication is activated and the content of the transmission restriction when the PDCP duplication is deactivated may be different. According to the current specification of 5G, when an RRC entity of a base station configures the PDCP duplication to be deactivated, an indication regarding changing the content of the transmission restriction is transmitted in order to use the resources more efficiently. This approach results in huge signaling overhead. However, if the content of the transmission restriction is not changed when the PDCP duplication is changed from activation to deactivation, resources will be wasted (e.g. resources corresponding to a certain cell may be blocked due to that cell is reserved for the PDCP duplication being activated).

Therefore, for the uplink scenario, 5G needs a more efficient way for activating and deactivating each RLC entity for the PDCP duplication as well as a more efficient way for changing the content of the transmission restriction.

SUMMARY

Provided is a base station. The base station in certain embodiments may comprise a processor and a transceiving interface, wherein the processor is electrically connected to the transceiving interface. The processor is configured to generate at least one Radio Resource Control (RRC) message for a user equipment. The at least one RRC message comprises a set of a plurality of activation criteria, and each of the activation criteria corresponds to one of a plurality of Radio Link Control (RLC) entities. The transceiving interface is configured to transmit the at least one RRC message to the user equipment. A plurality of logical channels are provided in a Medium Access Control (MAC) layer. Each of the RLC entities corresponds to at least one of the logical channels, each of the RLC entities corresponds to a working status, and each of the working statuses is one of an activation and a deactivation. At least one of the working statuses of the RLC entities is changed due to at least one of the activation criteria being satisfied. The processor further changes a transmission restriction of at least one specific logical channel among the logical channels based on the changed working statuses of the RLC entities.

Provided is a user equipment. The user equipment in certain embodiments may comprise a transceiving interface and a processor, wherein the transceiving interface is electrically connected to the processor. The transceiving interface is configured to receive at least one RRC message from at least one base station. The processor is configured to learn a plurality of activation criteria from the at least one RRC message, wherein each of the activation criteria corresponds to one of a plurality of RLC entities. A plurality of logical channels are provided in a MAC layer. Each of the RLC entities corresponds to at least one of the logical channels, each of the RLC entities corresponds to a working status, and each of the working statuses is one of an activation and a deactivation. At least one of the working statuses of the RLC entities is changed due to at least one of the activation criteria being satisfied. The processor further changes a transmission restriction of at least one specific logical channel among the logical channels based on the changed working statuses of the RLC entities.

The base station and the user equipment include enhanced Packet Data Convergence Protocol (PDCP) duplication, and the enhanced PDCP duplication can be achieved by having both the base station and the user equipment know a plurality of activation criteria of a plurality of RLC entities in advance. Since both the base station and the user equipment know the activation criteria of the RLC entities in advance, each of them is able to suspect whether any activation criterion has satisfied and learn that the corresponding RLC entity has to change its working status accordingly. In this way, activation and deactivation of each RLC entity for the PDCP duplication can be achieved more efficiently in various ways.

The enhanced PDCP duplication may be further achieved from the viewpoint of changing the content of the transmission restriction of a logical channel. In some aspects, the user equipment may send a MAC information element regarding how to change the transmission restriction(s) to the base station. In some other aspects, the user equipment and the base station may change the transmission restriction (s) based on the pre-agreed rule(s). Thereby, changing the content of the transmission restriction of a logical channel is achieved in a more efficient way.

The detailed technology and preferred embodiments implemented for the subject invention are described in the following paragraphs accompanying the appended drawings for people skilled in this field to well appreciate the features of the claimed invention.

DETAILED DESCRIPTION

In the following descriptions, the base station and the user equipment will be explained with reference to certain exemplary embodiments thereof. However, these exemplary embodiments are not intended to limit the present invention to any specific environment, example, embodiment, applications, or implementations described in these exemplary embodiments. Therefore, description of these exemplary embodiments is only for purpose of illustration rather than to limit the scope of the present invention.

It should be appreciated that, in the following exemplary embodiments and the attached drawings, elements unrelated to the present invention are omitted from depiction. In addition, dimensions of and dimensional scales between individual elements in the attached drawings are provided only for ease of depiction and illustration, but not to limit the scope of the present invention.

Figure 1A:
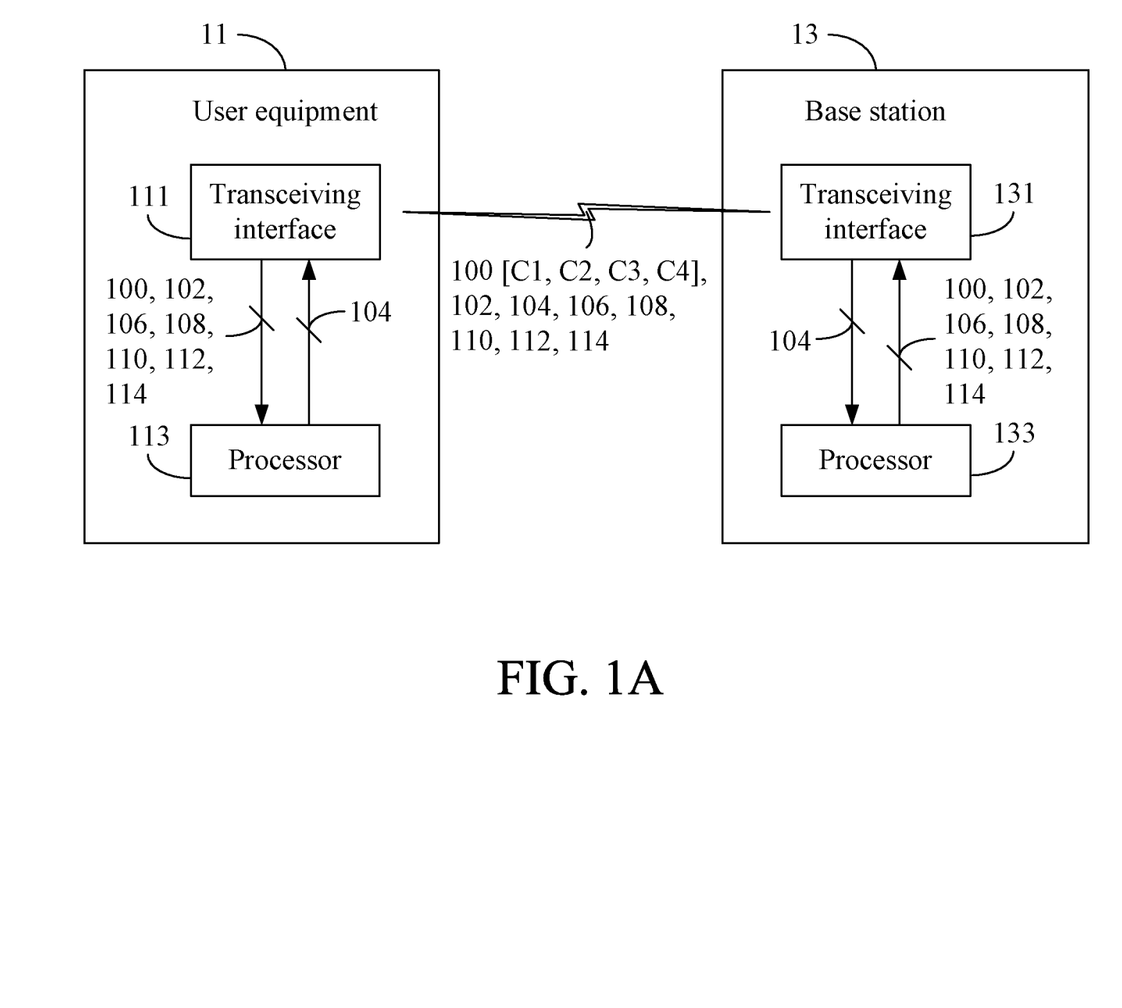
FIG. 1A illustrates a partial schematic view of a mobile communication system of various embodiments of the present invention.

A first embodiment of the present invention is a mobile communication system and a partial schematic view of which is depicted in FIG. 1A. The mobile communication system of this embodiment conforms to the specification of the fifth generation of mobile communication technology (5G). According to the current specification of 5G, up to four Radio Link Control (RLC) entities per Data Radio Bearer (DRB) (i.e. up to 4 legs per DRB) can be configured for Packet Data Convergence Protocol (PDCP) duplication. The architecture that supports PDCP duplication may be carrier aggregation, dual connectivity, or carrier aggregation combined with dual connectivity. In this embodiment, the architecture for PDCP duplication is carrier aggregation.

The mobile communication system comprises a user equipment 11 and a base station 13. Please note that a base station may be referred to as a gNodeB or gNB according to the specification of 5G. The user equipment 11 comprises a transceiving interface 111 and a processor 113, wherein the processor 113 is electrically connected to the transceiving interface 111. The transceiving interface 111 may be any interface capable of communicating with a base station. The processor 113 may be any of various processors, central processing units (CPUs), microprocessors, or other computing apparatuses known to those of ordinary skill in the art. The base station 13 comprises a transceiving interface 131 and a processor 133, wherein the processor 133 is electrically connected to the transceiving interface 131. The transceiving interface 131 may be any interface capable of communicating with a user equipment. The processor 133 may be any of various processors, CPUs, microprocessors, or other computing apparatuses known to those of ordinary skill in the art.

Figure 1B:
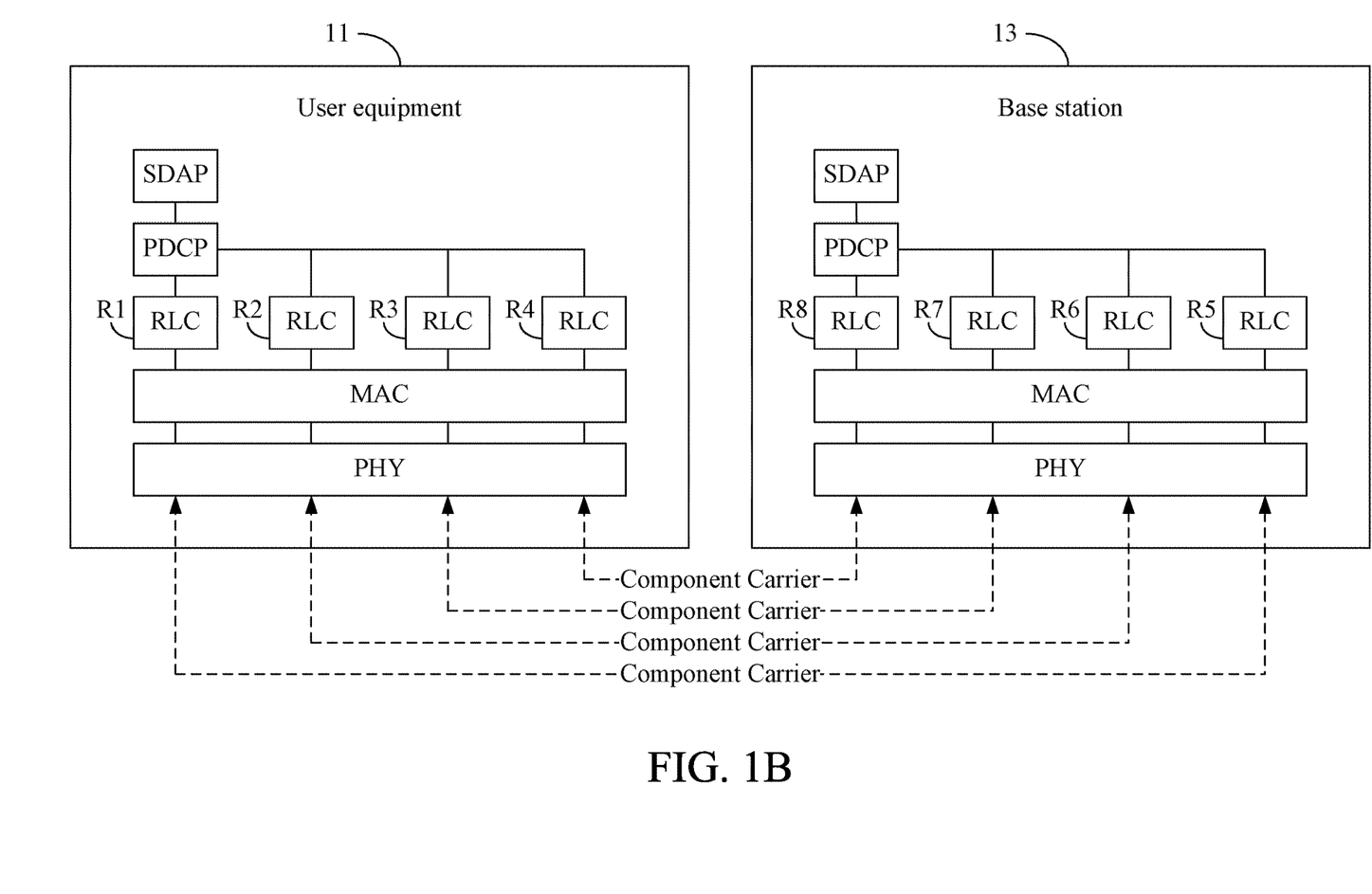
FIG. 1B illustrates the architecture of carrier aggregation for PDCP duplication.

The user plane protocol stack of the mobile communication system comprises a Service Data Adaptation Protocol (SDAP) layer, a Packet Data Convergence Protocol (PDCP) layer, a Radio Link Control (RLC) layer, a Medium Access Control (MAC) layer, and a Physical (PHY) layer from top to bottom. Since the architecture for PDCP duplication is carrier aggregation in this embodiment, there are four RLC entities R1, R2, R3, R4 for PDCP duplication in the user equipment 11 and four RLC entities R5, R6, R7, R8 for PDCP duplication in the base station 13 as shown in FIG. 1B. Please note that the number of the RLC entities in a user equipment and in a base station may be different in other embodiments.

Figure 1C:
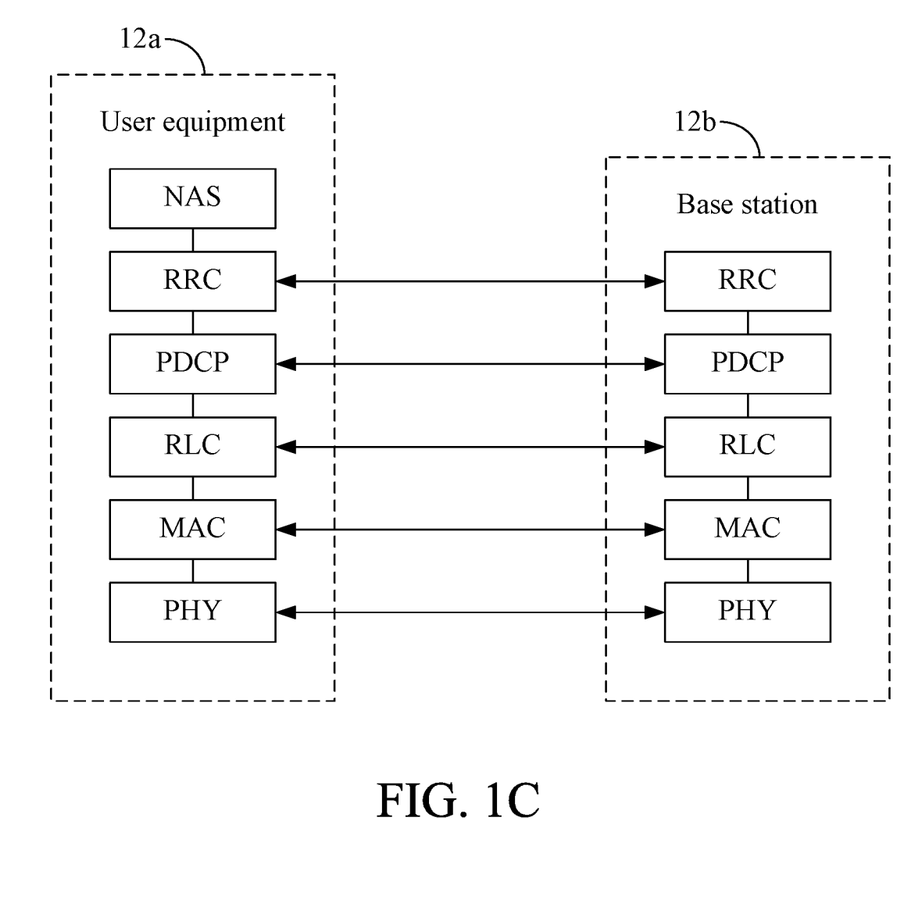
FIG. 1C illustrates the control plane protocol stack of the mobile communication system of various embodiments.

FIG. 1C depicts the control plane protocol stack of the mobile communication system, which comprises a Non-Access Stratum (NAS) layer, a Radio Resource Control (RRC) layer, a PDCP layer, an RLC layer, a MAC layer, and a PHY layer from top to down.

It is assumed that the user equipment 11 has attached to the base station 13. The user equipment 11 has to be configured after attaching to the base station 13. In addition to the conventional configurations that have to be performed according to the current specification of 5G, each of the RLC entities R1, R2, R3, R4 has to be configured with an activation criterion in this embodiment.

Specifically, in this embodiment, the RLC entities R1, R2, R3, R4 for PDCP duplication corresponds to the activation criteria C1, C2, C3, C4 respectively. An activation criterion of an RLC entity is a criterion regarding whether the RLC entity has to be activated or deactivated for PDCP duplication. Please note that an activation criterion of an RLC entity may be related to at least one of a channel condition (e.g. L1- or L3 filtered Reference Signal Receiving Power (RSRP)/ Reference Signal Receiving Quality (RSRQ) threshold, path loss) of the corresponding leg, a MAC Hybrid Automatic Repeat Request (HARQ) feedback of the corresponding leg, an RLC Automatic Repeat request (ARQ) of the corresponding leg, a packet drop rate of the corresponding leg, and a packet transmission delay of the corresponding leg. In addition, please note that the present invention does not limit the way to define the content of the aforesaid activation criteria. For example, the content of each activation criterion may be defined by an administrator of the mobile communication system and then inputted to the base station 13.

The processor 133 of the base station 13 generates an RRC message 100 for the user equipment 11, wherein the RRC message 100 comprises a set of the aforesaid activation criteria of the RLC entities R1, R2, R3, R4 of the user equipment 11 for PDCP duplication. The RRC message 100 comprises all of the aforesaid activation criteria C1, C2, C3, C4 (i.e. the activation criterion of each of the RLC entities R1, R2, R3, R4 of the user equipment 11). The RRC message 100 may be realized by an RRCConnectionSetup message defined in the 5G specification, an RRCConnecionReconfiguration message defined in the 5G specification, or an RRCConnecionResume message defined in the 5G specification, but it is not limited thereto. The transceiving interface 131 transmits the RRC message 100 to the user equipment 11. At the user equipment 11, the transceiving interface 111 receives the RRC message 100 from the base station 13, and the processor 113 learns that the activation criteria C1, C2, C3, C4 respectively correspond to its RLC entities R1, R2, R3, R4 from the RRC message 100.

It is assumed that the transceiving interface 131 of the base station 13 has transmitted an RRC message 102 to the user equipment 11, wherein the RRC message 102 comprises an information element indicating that the PDCP duplication is activated. The RRC message 102 may be realized by an RRCConnectionSetup message defined in the 5G specification, an RRCConnecionReconfiguration message defined in the 5G specification, or an RRCConnecionResume message defined in the 5G specification, but it is not limited thereto. At the user equipment 11, the transceiving interface 111 receives the RRC message 102 and the processor 113 learns that PDCP duplication is activated from the RRC message 102. As four RLC entities R1, R2, R3, R4 are configured for PDCP duplication, each of the RLC entities R1, R2, R3, R4 corresponds to a working status (i.e. activation or deactivation) for the PDCP duplication.

In some embodiments, the information element for indicating that the PDCP duplication is activated may be comprised in the RRC message 100 and, thus, the RRC message 102 may be omitted. Yet, in some other embodiments, it is pre-defined that the PDCP duplication is activated if the RRC message 100 comprises the activation criteria C1, C2, C3, C4. Thus, the information element for indicating that the PDCP duplication is activated may be omitted.

The MAC layer provides services to the RLC entities R1, R2, R3, R4 in the form of a plurality of logical channels (not shown), and each of the RLC entities R1, R2, R3, R4 corresponds to at least one of the logical channels. The working status of an RLC entity depends on the transmission restriction of the corresponding logical channel(s). Therefore, if a logical channel satisfies any activation criterion of the corresponding RLC entity (or the corresponding RLC entities), the working status of the RLC entity (or RLC entities) should be changed (either from being activated to being deactivated or from being deactivated to being activated).

In this embodiment, since both the base station 13 and the user equipment 11 know the activation criteria C1, C2, C3, C4 of the RLC entities R1, R2, R3, R4, both of them are able to know whether any of the activation criteria C1, C2, C3, C4 is satisfied. If one or more of the activation criteria C1, C2, C3, C4 is satisfied, the working status of the corresponding RLC entity (or RLC entities) will be changed. Based on the changed working statuses of the RLC entities R1, R2, R3, R4, both the processor 133 of the base station 13 and the processor 113 of the user equipment 11 will change the transmission restriction of at least one specific logical channel among the logical channels.

For example, if the activation criterion C1 of the RLC entity R1 is satisfied, the working status of the RLC entity R1 will be changed (either from being activated to being deactivated or from being deactivated to being activated), the logical channel(s) corresponding to the RLC entity R1 will be identified as the specific logical channel(s), and the transmission restriction(s) of the specific logical channel(s) will be changed.

By configuring the activation criteria C1, C2, C3, C4 for the RLC entities R1, R2, R3, R4 respectively and transmitting the activation criteria C1, C2, C3, C4 to the user equipment 11 in advance, both the base station 13 and the user equipment 11 are able to know whether any of the activation criteria C1, C2, C3, C4 is satisfied. Upon the detection that an activation criterion is satisfied, the working status of the corresponding RLC entity will be changed. In addition, the transmission restriction of the logical channel (s) corresponding to that RLC entity will be changed as well. Therefore, for the uplink scenario, activation and deactivation of the RLC entity (or RLC entities) for the PDCP duplication can be achieved efficiently, and content of the transmission restriction can be changed more efficiently as well. As a consequence, PDCP duplication is enhanced.

Please refer to FIGS. 1A-1C and FIG. 2 for a second embodiment of the present invention. Similar to the first embodiment, the base station 13 transmits the RRC message 100 to the user equipment 11 so that both the base station 13 and the user equipment 11 know the activation criteria C1, C2, C3, C4 of the RLC entities R1, R2, R3, R4 respectively. In addition, the base station 13 transmits the RRC message 102 to the user equipment 11 to indicate that the PDCP duplication is activated. Similarly, the information element for indicating that the PDCP duplication is activated may be comprised in the RRC message 100 and, thus, the RRC message 102 may be omitted. It is also feasible to pre-define that the PDCP duplication is activated if the RRC message 100 comprises the activation criteria C1, C2, C3, C4 and, hence, the information element for indicating that the PDCP duplication is activated may be omitted. In the following descriptions, only the differences between the second embodiment and the first embodiment will be described in details.

In this embodiment, the user equipment 11 is in charge of detecting whether any of the activation criteria C1, C2, C3, C4 is satisfied. In addition, the user equipment 11 is in charge of informing the base station 13 of the working status of each of the RLC entities R1, R2, R3, R4 as well as how to change the transmission restriction of each specific logical channel in a piggyback manner. Please note that a logical channel that corresponds to an RLC entity whose working status has to be changed (or corresponds to RLC entities whose working statuses have to be changed) is considered as a specific logical channel.

It is assumed that the user equipment 11 detects that some of the activation criteria C1, C2, C3, C4 is/are satisfied and determines that the working status of the corresponding RLC entity (or RLC entities) has/have to be changed. The processor 113 of the user equipment 11 selects at least one specific logical channel from the logical channels according the activation criteria; specifically, the processor 113 identifies the logical channel(s) that corresponds to the RLC entity (or RLC entities) whose working status has to be changed as the at least one specific logical channel.

At the user equipment 11, the processor 113 generates a MAC control element 104 for indicating the working status of each of the RLC entities R1, R2, R3, R4 as well as how to change the transmission restriction of each specific logical channel, and the transceiving interface 111 of the user equipment 11 transmits the MAC control element 104 to the base station 13. Please note that if the working status of an RLC entity (or RLC entities) has/have to be changed, the MAC control element 104 records the changed working status(es). For example, if the RLC entity R1 has to be changed from being deactivated to being activated, the working status of the RLC entity R1 is recorded as "activated" in the MAC control element 104.

To be more specific, the MAC control element 104 comprises a logical channel identity of each specific logical channel, the working status of each of the RLC entities R1, R2, R3, R4, and a DRB identity of the DRB that corresponds to the RLC entities R1, R2, R3, R4. The MAC control element 104 may conform to the format F1 shown in FIG. 2. The format F1 comprises a field LCID for each specific logical channel, four fields WS1, WS2, WS3, WS4 for indicating the working statuses of the RLC entities R1, R2, R3, R4 respectively, a field DRB_ID for indicating the corresponding DRB, and some reserved fields R.

Figure 2:
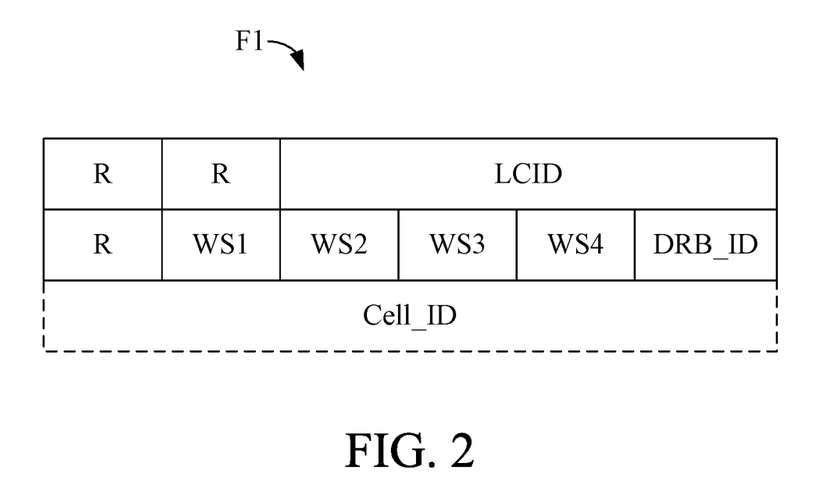
FIG. 2 illustrates the format F1 of the MAC control element 104 in the second embodiment.

At the base station 13, the transceiving interface 131 receives the MAC control element 104 from the user equipment 11 and the processor 133 learns the updated working statuses of the RLC entities R1, R2, R3, R4 from the fields WS1, WS2, WS3, WS4 respectively. In addition, the processor 133 identifies the specific logical channel(s) according to the logical channel identity (identities) recorded in the MAC control element 104 and then changes the transmission restriction of each specific logical channel. Please note that how to change the transmission restriction of a specific logical channel may be pre-agreed between the base station 13 and the user equipment 11.

In some embodiments, the MAC control element 104 may further comprise a cell identity for indicating an allowed serving cell of the specific logical channel(s). In those embodiments, the format F1 may further comprise an optional field Cell_ID for indicating a cell identity of an allowed serving cell for the specific logical channel(s). In those embodiments, the transmission restriction of each specific logical channel comprises a parameter of an allowed serving cell, and the processor 133 of the base station 13 changes each parameter of the allowed serving cell based on the cell identity.

Please note that the user equipment 11 will also perform the aforesaid changes (including working statuses and transmission restriction) done by the base station 13 so that the information at the user equipment 11 and the base station 13 is synchronized.

According to the above description, the user equipment 11 can inform the base station 13 of the working status of each of the RLC entities R1, R2, R3, R4 as well as how to change the transmission restriction of each specific logical channel by transmitting the MAC control element 104. Therefore, for the uplink scenario, activation and deactivation of the RLC entity (or RLC entities) for the PDCP duplication can be achieved efficiently, and content of the transmission restriction can be changed more efficiently as well. As a consequence, PDCP duplication is enhanced.

Please refer to FIG. 1A-1C and FIG. 3 for a third embodiment of the present invention. The third embodiment can be considered as an enhancement of the second embodiment. In the following descriptions, only the differences between the third embodiment and the second embodiment will be described in details.

Figure 3:
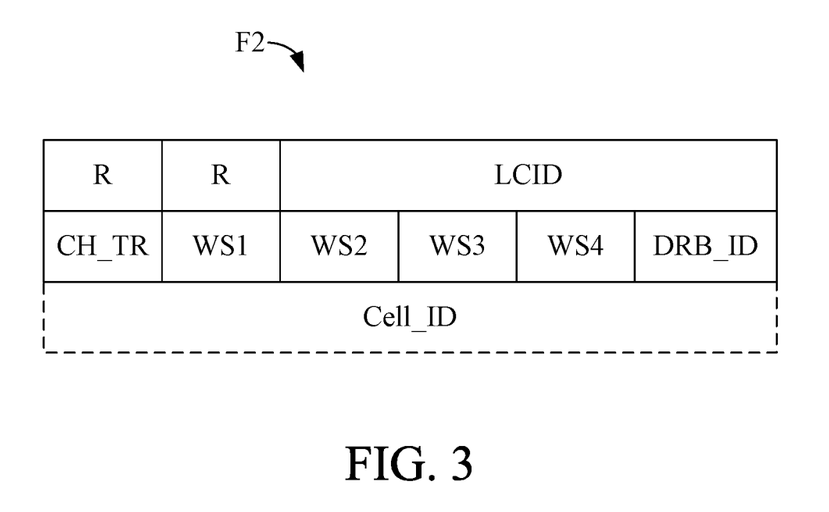
FIG. 3 illustrates the format F2 of the MAC control element 104 in the third embodiment.

In this embodiment, the MAC control element 104 generated by the user equipment 11 is used for informing the base station 13 of the working status of each of the RLC entities R1, R2, R3, R4, suggesting how to change the transmission restriction of each specific logical channel to the base station 13, and asking the base station 13 to determine the way to change the transmission restriction of each specific logical channel.

To be more specific, the MAC control element 104 comprises a logical channel identity of each specific logical channel, the working status of each of the RLC entities R1, R2, R3, R4, a DRB identity of the DRB that corresponds to the RLC entities R1, R2, R3, R4, and an indication of changing transmission restriction. In some embodiments, the MAC control element 104 may further comprise a cell identity for indicating an allowed serving cell of the specific logical channel(s). The MAC control element 104 may conform to the format F2 shown in FIG. 3. The format F2 comprises a field LCID for each specific logical channel, a field CH_TR for indicating whether to change transmission restriction, four fields WS1, WS2, WS3, WS4 for indicating the working statuses of the RLC entities R1, R2, R3, R4 respectively, a field DRB_ID for indicating the corresponding DRB, an optional field Cell_ID for indicating a cell identity of an allowed serving cell for the specific logical channel(s), and some reserved fields R.

The transceiving interface 111 of the user equipment 11 transmits the MAC control element 104 to the base station 13. At the base station 13, the transceiving interface 131 receives the MAC control element 104 from the user equipment 11 and the processor 133 learns the information recorded in the MAC control element 104. From the fields WS1, WS2, WS3, WS4, the processor 133 learns the updated working statuses of the RLC entities R1, R2, R3, R4 respectively.

From the field CH_TR, the processor 133 learns that the base station 13 has to determine the transmission restriction of each specific logical channel. From the field LCID and the field Cell_ID, the processor 133 learns the suggested transmission restriction(s) provided by the user equipment 11. With the field CH_TR in the MAC control element 104, the information recorded in the field LCID and the field Cell_ID are only suggestions. The processor 133 of the base station 13 may determine to follow the suggestions provided by the user equipment 11 (i.e. use the information recorded in the field LCID and the field Cell_ID to change the transmission restriction of each specific logical channel). Alternatively, the processor 133 of the base station 13 may change the transmission restriction of each specific logical channel in another way.

After the processor 133 of the base station 13 determines the way to change the transmission restriction of each specific logical channel, processor 133 further reconfigures the transmission restriction of each specific logical channel accordingly. In addition, the processor 133 generates an RRC reconfiguration message 106 comprising the reconfigured transmission restriction of each specific logical channel, and the transceiving interface 131 further transmits the RRC reconfiguration message 106 to the user equipment 11. The RRC reconfiguration message 106 may be realized by an RRCreconfiguration message defined in the 5G specification, an RRCresume message defined in the 5G specification, but it is not limited thereto.

At the user equipment 11, the transceiving interface 111 receives the RRC reconfiguration message 106 from the base station 13, and the processor 113 reconfigures the transmission restriction of each specific logical channel accordingly.

According to the above description, the user equipment 11 can inform the base station 13 of the working status of each of the RLC entities R1, R2, R3, R4, suggest the base station 13 how to change the transmission restriction of each specific logical channel, and ask the base station 13 to determine the way to change the transmission restriction of each specific logical channel (either adopting the suggestions provided by the user equipment 11 or determining another way). The base station 13 then informs the user equipment 11 of the determination. In this way, for the uplink scenario, activation and deactivation of the RLC entity (or RLC entities) for the PDCP duplication can be achieved efficiently, and content of the transmission restriction can be changed more efficiently and for flexibly. As a consequence, PDCP duplication is enhanced.

Please refer to FIG. 1A-1C and FIG. 4 for a fourth embodiment of the present invention. The fourth embodiment can be considered as an enhancement of the second embodiment. In the following descriptions, only the differences between the fourth embodiment and the second embodiment will be described in details.

Figure 4:
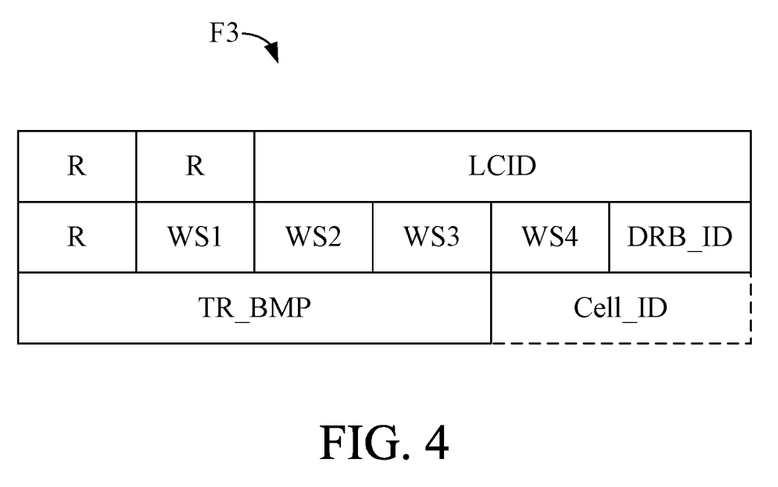
FIG. 4 illustrates the format F3 of the MAC control element 104 in the fourth embodiment.

In this embodiment, in addition to the conventional configurations that have to be performed according to the current specification of 5G and the configuration of the activation criteria of the RLC entities R1, R2, R3, R4, the processor 133 of the base station 13 further configures a bitmap configuration of a plurality of transmission restriction combinations. Each of the transmission restriction combinations corresponds to a scenario of the PDCP duplication (i.e. a set of the RLC entities R1, R2, R3, R4, which comprises activated RLC entities). For example, there might be a scenario that two of the RLC entities R1, R2, R3, R4 will be activated for the PDCP duplication, another scenario that three of the RLC entities R1, R2, R3, R4 will be activated for the PDCP duplication, and yet another scenario that all of the RLC entities R1, R2, R3, R4 will be activated for the PDCP duplication. Each transmission restriction combination comprises the transmission restrictions of the logical channels that corresponds to the activated RLC entities of the corresponding scenario.

The processor 133 of the base station 13 generates another RRC message 108 for the user equipment 11, wherein the RRC message 108 comprises the aforesaid bitmap configuration. The RRC message 108 may be realized by an RRCConnecionReconfiguration message defined in the 5G specification or an RRCConnecionResume message defined in the 5G specification, but it is not limited thereto. At the user equipment 11, the transceiving interface 111 receives the RRC message 108 and the processor 113 learns the bitmap configuration from the RRC message 108. In some other embodiments, the bitmap may be comprised in the RRC message 100 and, therefore, the RRC message 108 will be omitted. In some other embodiments, the aforesaid bitmap configuration may be preconfigured, and, therefore, does not have to be comprised in the RRC message 108 or the RRC message 100.

In this embodiment, the MAC control element 104 generated by the user equipment 11 is used for informing the base station 13 of the working status of each of the RLC entities R1, R2, R3, R4 and how to change the transmission restriction of each specific logical channel.

To be more specific, the MAC control element 104 comprises a logical channel identity of each specific logical channel, the working status of each of the RLC entities R1, R2, R3, R4, a DRB identity of the DRB that corresponds to the RLC entities R1, R2, R3, R4, and a bitmap corresponding to the aforesaid bitmap configuration. It is noted that the bitmap comprises a plurality of bits, wherein only one of the bits is on for indicating the scenario for the PDCP duplication. In some embodiments, the MAC control element 104 may further comprise a cell identity for indicating an allowed serving cell of the specific logical channel(s).

In this embodiment, the MAC control element 104 may conform to the format F3 shown in FIG. 4. The format F3 comprises a field LCID for each specific logical channel, four fields WS1, WS2, WS3, WS4 for indicating the working statuses of the RLC entities R1, R2, R3, R4 respectively, a field DRB_ID for indicating the corresponding DRB, a field TR_BMP for the bitmap, an optional field Cell_ID for indicating a cell identity of an allowed serving cell for the specific logical channel(s), and some reserved fields R.

The transceiving interface 111 of the user equipment 11 transmits the MAC control element 104 to the base station 13. At the base station 13, the transceiving interface 131 receives the MAC control element 104 from the user equipment 11 and the processor 133 learns the information recorded in the MAC control element 104. From the fields WS1, WS2, WS3, WS4, the processor 133 learns the updated working statuses of the RLC entities R1, R2, R3, R4 respectively.

In addition, the processor 133 selects one of the transmission restriction combinations according to bitmap recorded in the field TR_BMP. That is, the processor 133 looks for the bit which is on, selects the transmission restriction combination corresponding to that bit, and changes the transmission restriction of the at least one specific logical channel according to the selected transmission restriction combination.

Please note that the user equipment 11 will also perform the aforesaid changes (including working statuses and transmission restriction) done by the base station 13 so that the information at the user equipment 11 and the base station 13 is synchronized.

Figure 5:
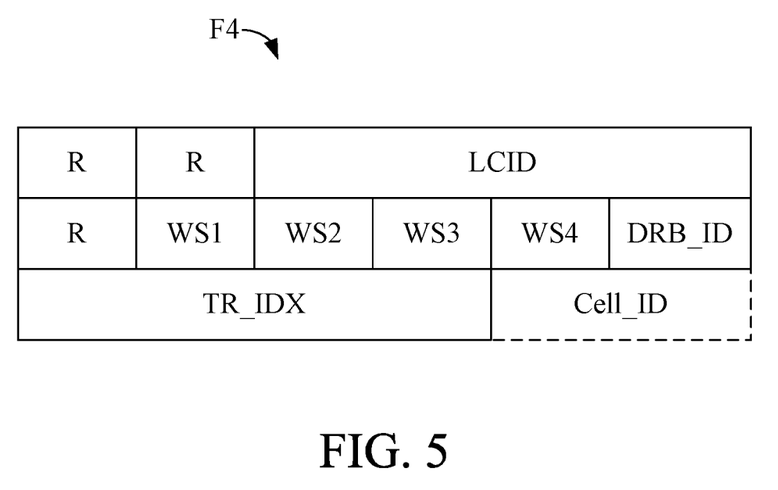
FIG. 5 illustrates another format F4 of the MAC control element 104 in the fourth embodiment.

In some embodiments, the aforesaid bitmap may be replaced by an index. For those embodiments, the RRC message 108 does not comprises the aforesaid bitmap configuration but comprises a plurality of indexes respectively corresponding to a plurality of transmission restriction combinations. As each transmission restriction combination corresponds to a scenario for PDCP duplication, it is understood that each index corresponds to one of the scenarios. For those embodiments, the MAC control element 104 does not comprise a bitmap but comprises one of the indexes. The index recorded in the MAC control element 104 corresponds to the decided scenario for the PDCP. The MAC control element 104 may conform to the format F4 shown in FIG. 5, wherein the field TR_IDX is for recoding the index.

According to the above description, the user equipment 11 can inform the base station 13 of the working status of each of the RLC entities R1, R2, R3, R4 as well as the specific way for changing the transmission restriction of each specific logical channel by transmitting the MAC control element 104. Therefore, for the uplink scenario, activation and deactivation of the RLC entity (or RLC entities) for the PDCP duplication can be achieved efficiently, and content of the transmission restriction can be changed more efficiently as well. As a consequence, PDCP duplication is enhanced.

Please refer to FIGS. 1A-1C for a fifth embodiment of the present invention. Similar to the first embodiment, the base station 13 transmits the RRC message 100 to the user equipment 11 so that both the base station 13 and the user equipment 11 know the activation criteria C1, C2, C3, C4 of the RLC entities R1, R2, R3, R4 respectively. In addition, the base station 13 transmits the RRC message 102 to the user equipment 11 to indicate that the PDCP duplication is activated. Please note that the information element for indicating that the PDCP duplication is activated may be comprised in the RRC message 100 and, thus, the RRC message 102 may be omitted. It is also feasible to pre-define that the PDCP duplication is activated if the RRC message 100 comprises the activation criteria C1, C2, C3, C4 and, hence, the information element for indicating that the PDCP duplication is activated may be omitted. In the following descriptions, only the differences between the fifth embodiment and the first embodiment will be described in details.

In this embodiment, in addition to the conventional configurations that have to be performed according to the current specification of 5G and the configuration of the activation criteria of the RLC entities R1, R2, R3, R4, the processor 133 of the base station 13 further configures a plurality of transmission restriction combinations. Each of the transmission restriction combinations corresponds to a scenario of the PDCP duplication (i.e. a set of the RLC entities R1, R2, R3, R4, which comprises activated RLC entities). Each transmission restriction combination comprises the transmission restrictions of the logical channels that corresponds to the activated RLC entities of the corresponding scenario.

The processor 133 of the base station 13 generates another RRC message 110 for the user equipment 11, wherein the RRC message 110 comprises the configured transmission restriction combinations. The RRC message 110 may be realized by an RRCConnecionReconfiguration message defined in the 5G specification or an RRCConnecionResume message defined in the 5G specification, but it is not limited thereto. At the user equipment 11, the transceiving interface 111 receives the RRC message 110 and the processor 113 learns the transmission restriction combinations from the RRC message 110. In some other embodiments, the transmission restriction combinations may be comprised in the RRC message 100 and, therefore, the RRC message 110 will be omitted.

In this embodiment, at least one of the RLC entities R1, R2, R3, R4 is considered as at least one designated RLC entity. For example, the RLC entity that served the user equipment 11 in the attachment procedure can be determined as a designated RLC entity. In another example, all the RLC entities R1, R2, R3, R4 can be determined as the designated RLC entities. Both the user equipment 11 and the base station 13 monitor the at least one designated RLC entity to see if any of them whose corresponding activation criterion is satisfied.

Since both the base station 13 and the user equipment 11 know the activation criterion of each designated RLC entity, both of them are able to know whether any designated RLC entity whose corresponding activation criterion is satisfied. If both the processor 133 of the base station 13 and the processor 113 of the user equipment 11 determine that any designated RLC entity whose corresponding activation criterion is satisfied, both of them will change the working status of that designated RLC entity. Based on the changed working statuses of the RLC entities R1, R2, R3, R4, both the processor 133 of the base station 13 and the processor 113 of the user equipment 11 will change the transmission restriction of at least one specific logical channel among the logical channels according to the corresponding transmission restriction combination. Please note that a logical channel that corresponds to an RLC entity whose working status has to be changed (or corresponds to RLC entities whose working statuses have to be changed) is considered as a specific logical channel.

For example, if the changed working statuses of the RLC entities R1, R2, R3, R4 are being activated, being activated, being deactivated, and being activated respectively, both the user equipment 11 and the base station 13 identify the scenario corresponding to the changed working statuses, select the transmission restriction combination corresponding to the identified scenario, and then change the transmission restriction of at least one specific logical channel among the logical channels according to the selected transmission restriction combination.

By configuring the activation criteria C1, C2, C3, C4 for the RLC entities R1, R2, R3, R4 respectively, configuring the transmission restriction combinations of different scenarios, and transmitting the aforesaid information to the user equipment 11 in advance, both the base station 13 and the user equipment 11 are able to know whether any designated RLC entity whose corresponding activation criterion is satisfied and how to change the transmission restriction accordingly. Therefore, for the uplink scenario, activation and deactivation of the RLC entity (or RLC entities) for the PDCP duplication can be achieved efficiently, and content of the transmission restriction can be changed more efficiently as well. As a consequence, PDCP duplication is enhanced.

Please refer to FIGS. 1A-1C and FIG. 6 for a sixth embodiment of the present invention. Similar to the first embodiment, the base station 13 transmits the RRC message 100 to the user equipment 11 so that both the base station 13 and the user equipment 11 know the activation criteria C1, C2, C3, C4 of the RLC entities R1, R2, R3, R4 respectively. In addition, the base station 13 transmits the RRC message 102 to the user equipment 11 to indicate that the PDCP duplication is activated. Please note that the information element for indicating that the PDCP duplication is activated may be comprised in the RRC message 100 and, thus, the RRC message 102 may be omitted. It is also feasible to pre-define that the PDCP duplication is activated if the RRC message 100 comprises the activation criteria C1, C2, C3, C4 and, hence, the information element for indicating that the PDCP duplication is activated may be omitted. In the following descriptions, only the differences between the sixth embodiment and the first embodiment will be described in details.

Figure 6:
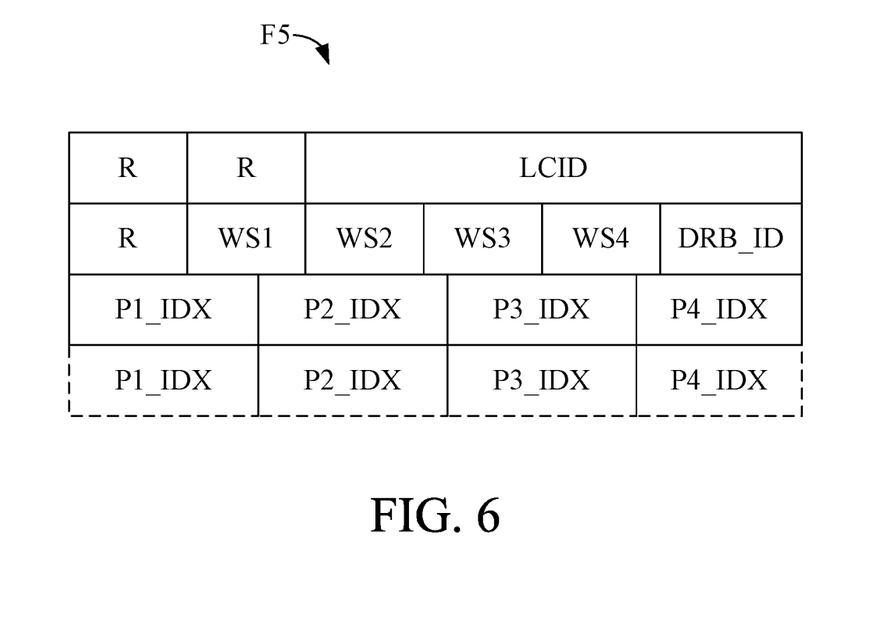
FIG. 6 illustrates another format F5 of the MAC control element 104 in the sixth embodiment.

In this embodiment, in addition to the conventional configurations that have to be performed according to the current specification of 5G and the configuration of the activation criteria of the RLC entities R1, R2, R3, R4, the processor 133 of the base station 13 further configures a plurality of parameter indexes for each parameter of a transmission restriction.

To be more specific, each transmission restriction comprises a plurality of parameters. For each distinct parameter, the processor 133 of the base station 13 configures a plurality of parameter indexes for indicating different values of that parameter. The processor 133 generates an RRC message 112 comprising the parameter indexes and the corresponding values of each distinct parameter, and the transceiving interface 131 transmits the RRC message 112 to the user equipment 11. The RRC message 112 may be realized by an RRCConnecionReconfiguration message defined in the 5G specification or an RRCConnecionResume message defined in the 5G specification, but it is not limited thereto. At the user equipment 11, the transceiving interface 111 receives the RRC message 112 and the processor 113 learns the parameter indexes and the corresponding values of each parameter from the RRC message 112.

Please note that, in some embodiments, the parameter indexes and the corresponding values of each parameter may be comprised in the RRC message 100 and, therefore, the RRC message 112 will be omitted. Yet, in some other embodiments, the parameter indexes and the corresponding values of each parameter may be predetermined and, hence, the RRC message 112 will be omitted as well.

In this embodiment, the user equipment 11 is in charge of detecting whether any of the activation criteria C1, C2, C3, C4 is satisfied, informing the base station 13 of the working status of each of the RLC entities R1, R2, R3, R4, and informing the base station 13 of how to change the transmission restriction of each specific logical channel. Please note that a logical channel that corresponds to an RLC entity whose working status has to be changed (or corresponds to RLC entities whose working statuses have to be changed) is considered as a specific logical channel.

It is assumed that the user equipment 11 detects that some of the activation criteria C1, C2, C3, C4 is/are satisfied and determines that the working status of the corresponding RLC entity (or RLC entities) has/have to be changed. The processor 113 identifies the logical channel(s) that corresponds to the RLC entity (or RLC entities) whose working status has to be changed as the at least one specific logical channel.

At the user equipment 11, the processor 113 generates a MAC control element 104 for indicating the working status of each of the RLC entities R1, R2, R3, R4. Please note that if the working status of an RLC entity (or RLC entities) has/have to be changed, the MAC control element 104 records the changed working status(es). In this embodiment, an RLC entity whose working status is activated is referred to as a designated RLC entity. The MAC control element 104 also indicates how to change the transmission restriction(s) according to each designated RLC entity. The transceiving interface 111 of the user equipment 11 transmits the MAC control element 104 to the base station 13.

To be more specific, the MAC control element 104 comprises a logical channel identity of each specific logical channel, the working status of each of the RLC entities R1, R2, R3, R4, a DRB identity of the DRB that corresponds to the RLC entities R1, R2, R3, R4, and a plurality of parameter indexes of the parameters of the transmission restriction of each designated RLC entity. The MAC control element 104 may conform to the format F5 shown in FIG. 6. The format F5 comprises a field LCID for each specific logical channel, four fields WS1, WS2, WS3, WS4 for indicating the working statuses of the RLC entities R1, R2, R3, R4 respectively, a field DRB_ID for indicating the corresponding DRB, several parameter indexes P1_IDX, P2_IDX, P3_IDX, P4_IDX, and some reserved fields R.

In this embodiment, each transmission restriction comprises four parameters, including a parameter indicating the allowed serving cell, a parameter indicating the maximum PUSCH duration allowed for transmission, a parameter indicating whether a configured grant (Type 1) can be used for transmission, and a parameter indicating the allowed subcarrier spacing for transmission. Hence, four parameter indexes P1_IDX, P2_IDX, P3_IDX, P4_IDX for each designated RLC entity are recorded in the MAC control element 104. In other embodiments, the number of the parameters comprised in a transmission restriction may be different and, thus, the number of parameter indexes for each designated RLC entity will be different.

At the base station 13, the transceiving interface 131 receives the MAC control element 104 from the user equipment 11 and the processor 133 learns the updated working statuses of the RLC entities R1, R2, R3, R4 from the fields WS1, WS2, WS3, WS4 respectively. In addition, the processor 133 identifies the parameter indexes P1_IDX, P2_IDX, P3_IDX, P4_IDX for each designated RLC entity and then changes the values of the corresponding parameters accordingly.

Please note that the user equipment 11 will also perform the aforesaid changes (including working statuses and transmission restriction) done by the base station 13 so that the information at the user equipment 11 and the base station 13 is synchronized.

According to the above description, the user equipment 11 can inform the base station 13 of the working status of each of the RLC entities R1, R2, R3, R4 as well as how to change the transmission restriction of each specific logical channel by transmitting the MAC control element 104. Therefore, for the uplink scenario, activation and deactivation of the RLC entity (or RLC entities) for the PDCP duplication can be achieved efficiently, and content of the transmission restriction can be changed more efficiently as well. As a consequence, PDCP duplication is enhanced.

Please refer to FIGS. 1A-1C and FIG. 7 for a seventh embodiment of the present invention. Similar to the first embodiment, the base station 13 transmits the RRC message 100 to the user equipment 11 so that both the base station 13 and the user equipment 11 know the activation criteria C1, C2, C3, C4 of the RLC entities R1, R2, R3, R4 respectively. In addition, the base station 13 transmits the RRC message 102 to the user equipment 11 to indicate that the PDCP duplication is activated. Please note that the information element for indicating that the PDCP duplication is activated may be comprised in the RRC message 100 and, thus, the RRC message 102 may be omitted. It is also feasible to pre-define that the PDCP duplication is activated if the RRC message 100 comprises the activation criteria C1, C2, C3, C4 and, hence, the information element for indicating that the PDCP duplication is activated may be omitted. In the following descriptions, only the differences between the seventh embodiment and the first embodiment will be described in details.

Figure 7:
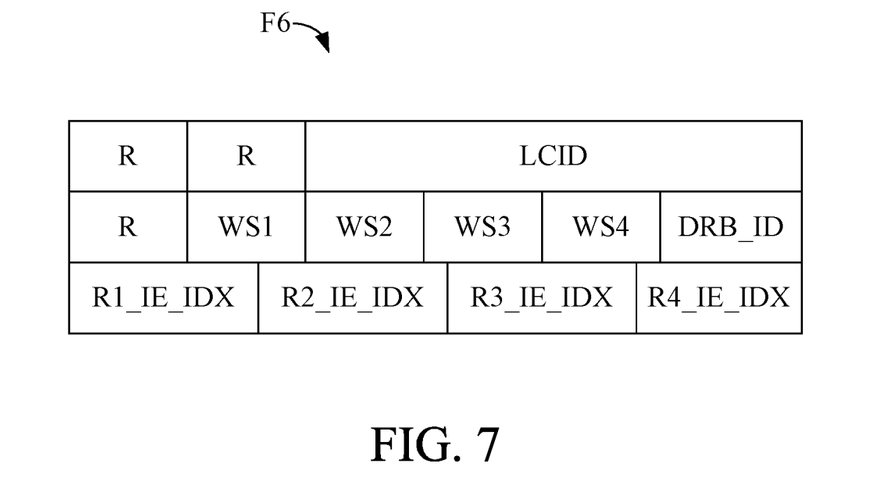
FIG. 7 illustrates another format F6 of the MAC control element 104 in the seventh embodiment.

In this embodiment, in addition to the conventional configurations that have to be performed according to the current specification of 5G and the configuration of the activation criteria of the RLC entities R1, R2, R3, R4, the processor 133 of the base station 13 further configures a plurality of transmission restriction parameters.

Specifically, the processor 133 further generates an RRC message 114, wherein the RRC message 114 comprises a plurality of information elements, each of the information elements configures a plurality of transmission restriction parameters (i.e. a plurality of parameters of a transmission restriction), and each of the information elements has an index. The RRC message 114 may be realized by an RRCConnecionReconfiguration message defined in the 5G specification or an RRCConnecionResume message defined in the 5G specification, but it is not limited thereto.

For convenience, it is assumed that a transmission restriction comprises four parameters, including a parameter indicating the allowed serving cell, a parameter indicating the maximum PUSCH duration allowed for transmission, a parameter indicating whether a configured grant (Type 1)

can be used for transmission, and a parameter indicating the allowed subcarrier spacing for transmission. Nevertheless, please note that the present invention does not limit the number of parameters comprised in a transmission restriction to any specific number. Please also note that the aforesaid parameters are just examples. Since a transmission restriction comprises four parameters, each of the information elements comprised in the RRC message 114 comprises four transmission restriction parameters for indicating the values of the four parameters of a transmission restriction.

The transceiving interface 131 of the base station 13 transmits the RRC message 114 to the user equipment 11. At the user equipment 11, the transceiving interface 111 receives the RRC message 114 and the processor 113 learns the information elements and their contents from the RRC message 114. Please note that, in some embodiments, the aforesaid information elements may be comprised in the RRC message 100 and, therefore, the RRC message 114 will be omitted.

In this embodiment, the user equipment 11 is in charge of detecting whether any of the activation criteria C1, C2, C3, C4 is satisfied, informing the base station 13 of the working status of each of the RLC entities R1, R2, R3, R4, and informing the base station 13 of how to change the transmission restriction of each specific logical channel. Please note that a logical channel that corresponds to an RLC entity whose working status has to be changed (or corresponds to RLC entities whose working statuses have to be changed) is considered as a specific logical channel.

It is assumed that the user equipment 11 detects that some of the activation criteria C1, C2, C3, C4 is/are satisfied and determines that the working status of the corresponding RLC entity (or RLC entities) has/have to be changed. The processor 113 identifies the logical channel(s) that corresponds to the RLC entity (or RLC entities) whose working status has to be changed as the at least one specific logical channel.

The processor 113 of the user equipment 11 generates a MAC control element 104 for indicating the working status of each of the RLC entities R1, R2, R3, R4. Please note that if the working status of an RLC entity (or RLC entities) has/have to be changed, the MAC control element 104 records the changed working status(es). In this embodiment, the MAC control element 104 also indicates how to change the transmission restriction(s) according to the working statuses of the RLC entities R1, R2, R3, R4. The transceiving interface 111 of the user equipment 11 then transmits the MAC control element 104 to the base station 13.

To be more specific, the MAC control element 104 comprises a logical channel identity of each specific logical channel, the working status of each of the RLC entities R1, R2, R3, R4, a DRB identity of the DRB that corresponds to the RLC entities R1, R2, R3, R4, and a designated index for each of the RLC entities R1, R2, R3, R4, wherein each of the designated indexes is one of the aforesaid indexes of the information elements. The MAC control element 104 may conform to the format F6 shown in FIG. 7. The format F6 comprises a field LCID for each specific logical channel, four fields WS1, WS2, WS3, WS4 for indicating the working statuses of the RLC entities R1, R2, R3, R4 respectively, a field DRB_ID for indicating the corresponding DRB, four designated indexes R1_IE_IDX, R2_IE_IDX, R3_IE_IDX, R4_IE_IDX respectively corresponding to the RLC entities R1, R2, R3, R4.

At the base station 13, the transceiving interface 131 receives the MAC control element 104 from the user equipment 11 and the processor 133 learns the updated working statuses of the RLC entities R1, R2, R3, R4 from the fields WS1, WS2, WS3, WS4 respectively. In addition, the processor 133 learns the four designated indexes R1_IE_IDX, R2_IE_IDX, R3_IE_IDX, R4_IE_IDX from the MAC control element 104 and knows how to change the parameters of the transmission restriction of each specific logical channel.

Please note that the user equipment 11 will also perform the aforesaid changes (including working statuses and transmission restriction) done by the base station 13 so that the information at the user equipment 11 and the base station 13 is synchronized.

According to the above description, the user equipment 11 can inform the base station 13 of the working status of each of the RLC entities R1, R2, R3, R4 as well as how to change the transmission restriction of each specific logical channel by transmitting the MAC control element 104. Therefore, for the uplink scenario, activation and deactivation of the RLC entity (or RLC entities) for the PDCP duplication can be achieved efficiently, and content of the transmission restriction can be changed more efficiently as well. As a consequence, PDCP duplication is enhanced.

Figure 8:
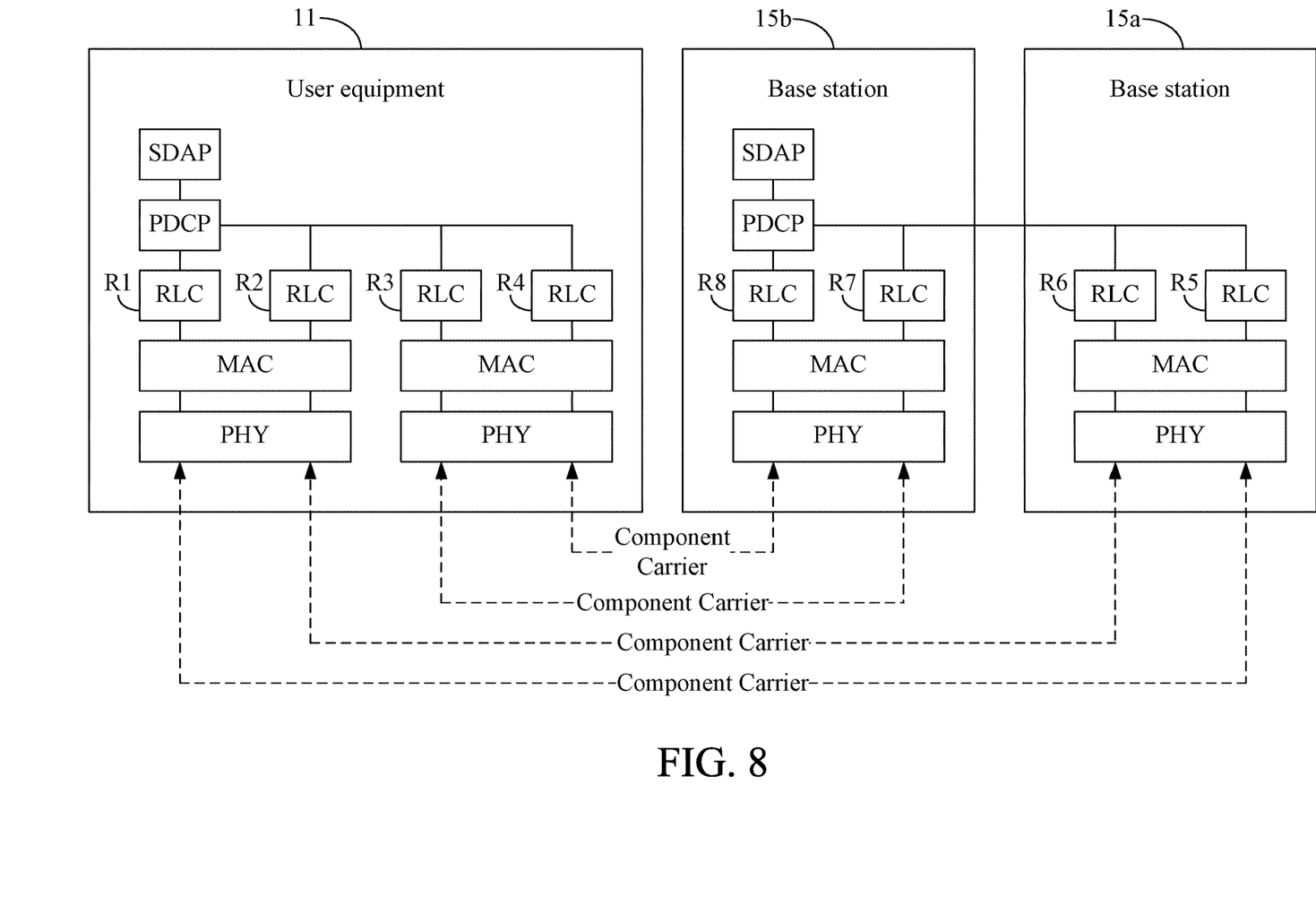
FIG. 8 illustrates the architecture of carrier aggregation combined with dual connectivity for PDCP duplication.

In some embodiments, the architecture for PDCP duplication may be carrier aggregation combined with dual connectivity, and an exemplary illustration of the architecture is given in FIG. 8. The exemplary mobile communication system shown in FIG. 8 comprises a user equipment 11 and two base stations 15a, 15b, wherein four RLC entities R1, R2, R3, R4 are in the user equipment 11, two RLC entities R5, R6 are in the base station 15a, and two RLC entities R7, R8 are in the base station 15b. Please note that there might be more than two base stations when the dual connectivity is adopted. Please also note that the number of the RLC entities comprised in a base station is not limited to two.

Figure 9:
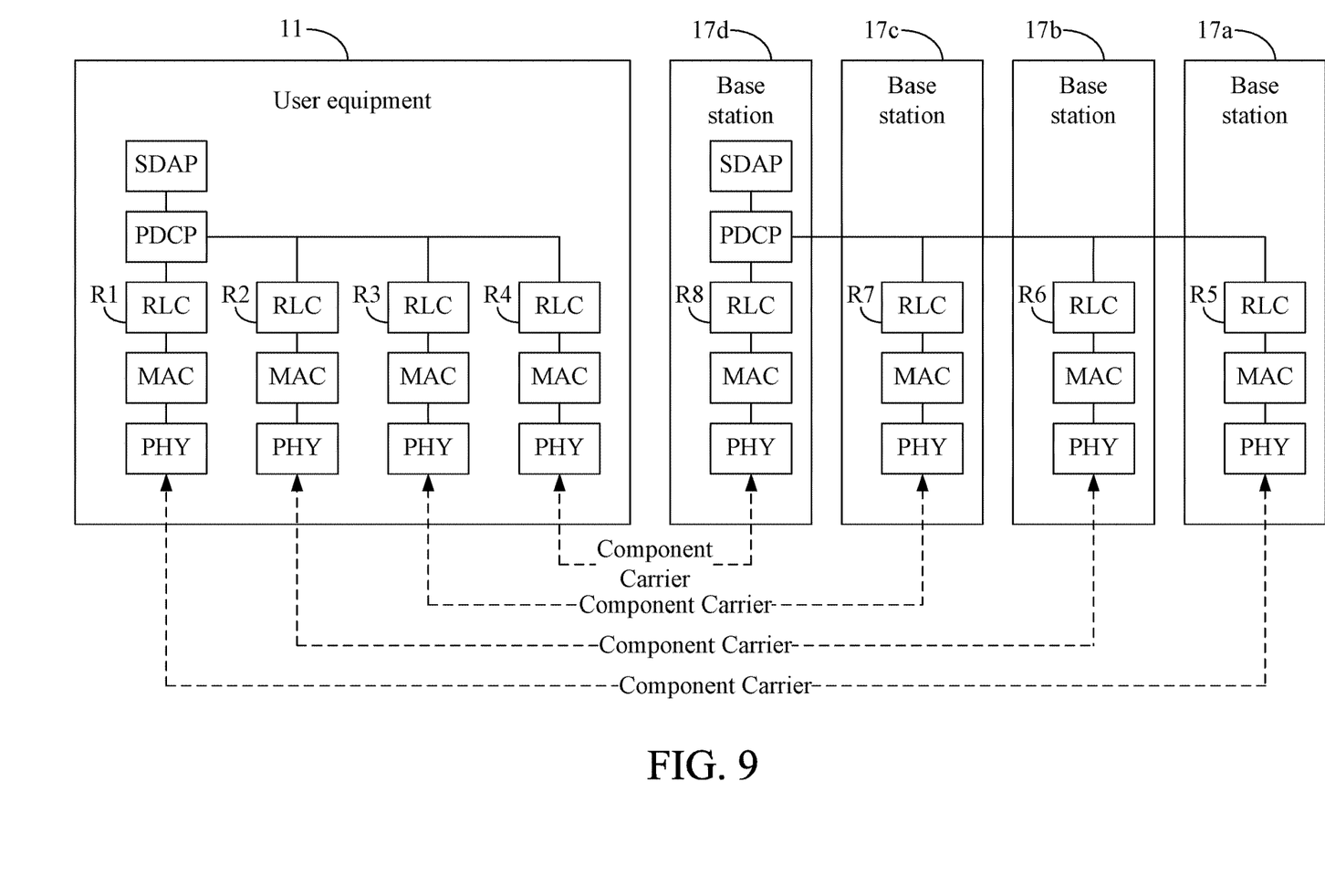
FIG. 9 illustrates the architecture of dual connectivity for PDCP duplication.

Yet, in some other embodiments, the architecture for PDCP duplication may be dual connectivity, and an exemplary illustration of the architecture is given in FIG. 9. The exemplary mobile communication system shown in FIG. 9 comprises a user equipment 11 and four base stations 17a, 17b, 17c, 17d, wherein four RLC entities R1, R2, R3, R4 are in the user equipment 11, one RLC entity R5 is in the base station 17a, one RLC entity R6 is in the base station 17b, one RLC entity R7 is in the base station 17c, and one RLC entity R8 is in the base station 17d. Please note that the number of the base stations is not limited to four.

The aforesaid first to seventh embodiments may be applied to the architecture of carrier aggregation combined with dual connectivity or the architecture of dual connectivity. Comparing to the architecture of the carrier aggregation, one important characteristic of the architecture of carrier aggregation combined with dual connectivity and the architecture of dual connectivity should be mentioned. That is, when adopting the architecture of carrier aggregation combined with dual connectivity or the architecture of dual connectivity, information regarding activation criteria C1, C2, C3, C4 and transmission restrictions will be communicated through Xn interface. Hence, network coordination is beneficial for PDCP duplication in the uplink scenario.

For example, assuming that each base station has two legs for the user equipment 11 (e.g. the base stations 15a, 15b shown in FIG. 8), the master base station (e.g. the base station 15a) coordinates the activation criteria C1, C2, C3, C4 and the transmission restrictions among the base stations 15a, 15b. Thereafter, all the activation criteria C1, C2, C3, C4 and the transmission restrictions may be transmitted by the master base station (e.g. the base station 15a) to the user equipment 11 by transmitting one or more RRC messages. Alternatively, each of the master base station (e.g. the base station 15a) and the secondary base station (e.g. the base station 15b) may transmit its corresponding activation criteria and transmission restrictions to the user equipment 11.

When the architecture of dual connectivity is adopted, some timely coordination between the base stations may be needed. When certain information relating to the RLC activation is exchanged between the base stations via Xn interface, RRC messages may be transmitted by two alternative approaches. In one approach, a coordinated base station (which may the base station that the user equipment 11 performed the attachment procedure or the primary serving base station of the user equipment 11) is in charge of transmitting all the RRC messages; that is, the coordinated base station assists other base station(s) to transmit the RRC messages. In another approach, each base station transmits its own activation criterion and transmission restriction by one or more RRC messages.

The base station and the user equipment provided by the present invention are with enhanced PDCP duplication, which is achieved by having both the base station and the user equipment know a plurality of activation criteria of a plurality of RLC entities in advance. Since both the base station and the user equipment know the activation criteria of the RLC entities in advance, each of them is able to suspect whether any activation criterion has satisfied and learn that the corresponding RLC entity has to change its working status accordingly. In this way, activation and deactivation of each RLC entity for the PDCP duplication can be achieved more efficiently in various ways.

The enhanced PDCP duplication may be further achieved from the viewpoint of changing the content of the transmission restriction of a logical channel. In some aspects, the user equipment may send a MAC information element regarding how to change the transmission restriction(s) to the base station. In some other aspects, the user equipment and the base station may change the transmission restriction(s) based on the pre-agreed rule(s). Thereby, changing the content of the transmission restriction of a logical channel is achieved in a more efficient way.

The above disclosure is related to the detailed technical contents and inventive features thereof. A person having ordinary skill in the art may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A base station, comprising:
   a processor, being configured to generate at least one Radio Resource Control (RRC) message for a user equipment, wherein the at least one RRC message comprises a first set of a plurality of activation criteria, and each of the activation criteria corresponds to one of a plurality of Radio Link Control (RLC) entities; and
   a transceiving interface, being electrically connected to the processor and configured to transmit the at least one RRC message to the user equipment,
   wherein a plurality of logical channels are provided in a Medium Access Control (MAC) layer, each of the RLC entities corresponds to at least one of the logical channels, each of the RLC entities corresponds to a working status, and each of the working statuses is one of an activation and a deactivation,
   wherein at least one of the working statuses of the RLC entities is changed due to at least one of the activation criteria being satisfied, and the processor further changes a transmission restriction of at least one specific logical channel among the logical channels based on the changed working statuses of the RLC entities,
   wherein the transceiving interface further receives a MAC control element from the user equipment, the MAC control element comprises a logical channel identity, the working status of each of the RLC entities, and a Data Radio Bearer (DRB) identity, and the at least one specific logical channel is identified by the logical channel identity.

2. The base station of claim 1, wherein the processor further coordinates the activation criteria and the transmission restrictions among the base station and at least one another base station.

3. The base station of claim 1, wherein the MAC control element further comprises a cell identity, the transmission restriction of each specific logical channel comprises a parameter of an allowed serving cell, and the processor changes each parameter of the allowed serving cell based on the cell identity.

4. The base station of claim 1, wherein the MAC control element further comprises an indication of changing transmission restriction, the processor further reconfigures the transmission restriction of each specific logical channel, the processor further generates an RRC reconfiguration message comprising the reconfigured transmission restriction of each specific logical channel, and the transceiving interface further transmits the RRC reconfiguration message to the user equipment.

5. The base station of claim 1, wherein the at least one RRC message further comprises a bitmap configuration of a plurality of transmission restriction combinations, and each of the transmission restriction combinations corresponds to a second set of the RLC entities,
   wherein the MAC control element further comprises a bitmap corresponding to the bitmap configuration, the bitmap comprises a plurality of bits, only one of the bits is on, and the transmission restriction of the at least one specific logical channel is changed based on the bitmap.

6. The base station of claim 1, wherein the at least one RRC message further comprises a plurality of indexes respectively corresponding to a plurality of transmission restriction combinations, each of the transmission restriction combinations corresponds to a second set of the RLC entities,
   wherein the MAC control element further comprises one of the indexes, and the transmission restriction of the at least one specific logical channel is changed based on the index comprised in the MAC control element.

7. The base station of claim 1, wherein the at least one RRC message further configures a plurality of transmission restriction combinations, each of the transmission restriction combinations corresponds to a second set of the RLC entities,
   wherein one of the RLC entities is a designated RLC entity, the processor further determines that the designated RLC entity satisfies the corresponding activation criterion.

8. The base station of claim 1,
   wherein at least one designated RLC entity whose working status is recorded as the activation in the MAC control element, each designated RLC entity is one of the RLC entities, and the MAC control element further comprises a plurality of parameter indexes of the transmission restriction of each of the at least one designated RLC entity.

9. The base station of claim 1, wherein the at least one RRC message further comprises a plurality of information elements, each of the information elements configures a plurality of transmission restriction parameters, each of the information elements has an index,
wherein the MAC control element further comprises a designated index for each of the RLC entities, and each of the designated indexes is one of the indexes.

10. A user equipment, comprising:
a transceiving interface, being configured to receive at least one RRC message from at least one base station; and
a processor, being electrically connected to the transceiving interface and configured to learn a plurality of activation criteria from the at least one RRC message, wherein each of the activation criteria corresponds to one of a plurality of RLC entities,
wherein a plurality of logical channels are provided in a Medium Access Control (MAC) layer, each of the RLC entities corresponds to at least one of the logical channels, each of the RLC entities corresponds to a working status, and each of the working statuses is one of an activation and a deactivation,
wherein at least one of the working statuses of the RLC entities is changed due to at least one of the activation criteria being satisfied, and the processor further changes a transmission restriction of at least one specific logical channel among the logical channels based on the changed working statuses of the RLC entities,
wherein the at least one RRC message further comprises a plurality of information elements, each of the information elements configures a plurality of transmission restriction parameters, each of the information elements has an index,
wherein the transceiving interface further transmits a MAC control element to each of the at least one base station, the MAC control element comprises a logical channel identity of each of the at least one specific logical channel, the working status of each of the RLC entities, and a DRB identity,
wherein the MAC control element further comprises a designated index for each of the RLC entities, and each of the designated indexes is one of the indexes.

11. The user equipment of claim 10, wherein the processor further selects the at least one specific logical channel from the logical channels according the activation criteria.

12. The user equipment of claim 10, wherein the MAC control element further comprises a cell identity, the transmission restriction of each specific logical channel comprises a parameter of an allowed serving cell, and the processor changes each parameter of the allowed serving cell based on the cell identity.

13. The user equipment of claim 10, wherein the MAC control element further comprises an indication of changing transmission restriction, the transceiving interface further receives an RRC reconfiguration message from one of the at least one base station, wherein the RRC reconfiguration message comprises a reconfigured transmission restriction of each specific logical channel.

14. The user equipment of claim 10, wherein the at least one RRC message further comprises a bitmap configuration of a plurality of transmission restriction combinations, and each of the transmission restriction combinations corresponds to a second set of the RLC entities,
wherein the MAC control element further comprises a bitmap corresponding to the bitmap configuration, the bitmap comprises a plurality of bits, only one of the bits is on, and the transmission restriction of the at least one specific logical channel is changed based on the bitmap.

15. The user equipment of claim 10, wherein the at least one RRC message further comprises a plurality of indexes respectively corresponding to a plurality of transmission restriction combinations, each of the transmission restriction combinations corresponds to a second set of the RLC entities,
wherein the MAC control element further comprises one of the indexes, and the transmission restriction of the at least one specific logical channel is changed based on the index comprised in the MAC control element.

16. The user equipment of claim 10, wherein the at least one RRC message further configures a plurality of transmission restriction combinations, each of the transmission restriction combinations corresponds to a second set of the RLC entities,
wherein one of the RLC entities is a designated RLC entity, the processor further determines that the designated RLC entity satisfies the corresponding activation criterion.

17. The user equipment of claim 10,
wherein at least one designated RLC entity whose working status is recorded as the activation in the MAC control element, each designated RLC entity is one of the RLC entities, and the MAC control element further comprises a plurality of parameter indexes of the transmission restriction of each of the at least one designated RLC entity.

* * * * *